United States Patent
Bastian

[19]

[11] Patent Number: 6,125,600
[45] Date of Patent: Oct. 3, 2000

[54] GUIDE MEMBER FOR A LANDSCAPE SYSTEM

[75] Inventor: John M. Bastian, Manitowoc, Wis.

[73] Assignee: Fisher Hamilton Inc., Two Rivers, Wis.

[21] Appl. No.: 09/093,251

[22] Filed: Jun. 8, 1998

[51] Int. Cl.[7] ............................................. E04C 2/52
[52] U.S. Cl. ..................... 52/220.7; 52/239; 52/242; 52/287.1
[58] Field of Search ................... 52/220.7, 239, 52/242, 241, 287.1, 288.1, 731.5, 731.9

[56] References Cited

U.S. PATENT DOCUMENTS

| | | |
|---|---|---|
| 2,766,855 | 10/1956 | Johnson et al. ............................ 52/242 |
| 3,034,609 | 5/1962 | Young ..................................... 52/220.7 |
| 4,104,837 | 8/1978 | Naito ...................................... 52/745.1 |
| 4,631,881 | 12/1986 | Charman .................................. 52/220 |
| 5,056,577 | 10/1991 | DeLong et al. ........................... 52/239 |
| 5,070,666 | 12/1991 | Looman .................................... 52/239 |
| 5,479,747 | 1/1996 | Wu ........................................ 52/220.7 |
| 5,685,113 | 11/1997 | Reuter et al. ........................... 52/220.7 |

*Primary Examiner*—Beth A. Stephan
*Assistant Examiner*—Dennis L. Dorsey
*Attorney, Agent, or Firm*—Niro, Scavone, Haller & Niro

[57] ABSTRACT

One or more guide members secured to an edge portion of a support or partition member direct conduits or any other elongate object along a predetermined path on the edge portion. The guide members include a body portion that defines an opening through which the conduits or other objects extend and a securing portion that secures the guide members to the support or partition.

5 Claims, 3 Drawing Sheets

FIG. 1
FIG. 2
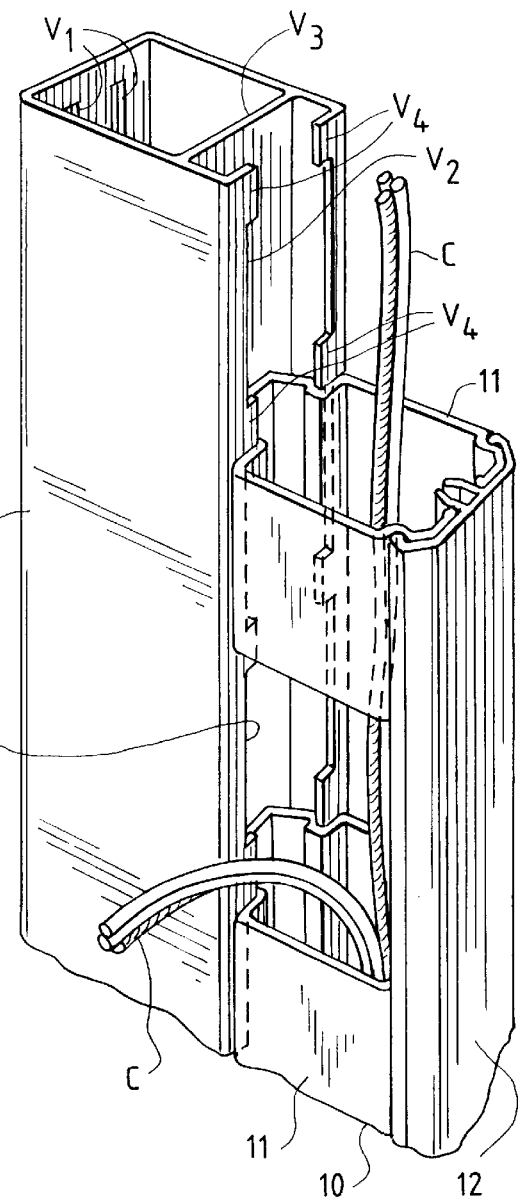
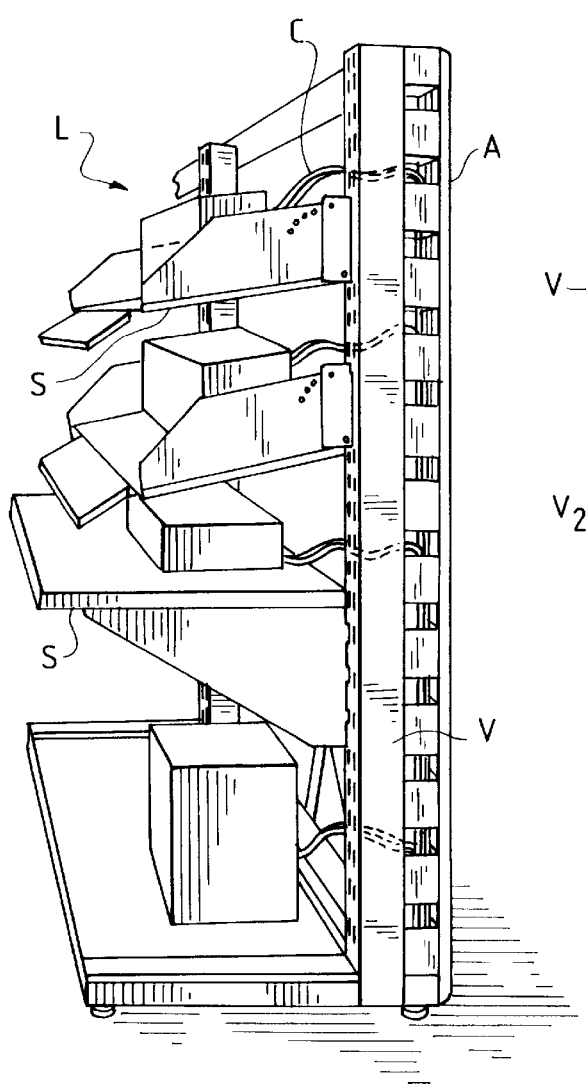

GUIDE MEMBER FOR A LANDSCAPE SYSTEM

BACKGROUND OF THE INVENTION

1. Field of the Invention

The present invention relates to a guide member for a support or partition, and more particularly to a guide member that cooperates with edge portions of the support or partition to restrain and route cables, conduits or any other elongate object along a predetermined path on the edge portions.

2. Description of the Prior Art

The prior art includes a large number of office and laboratory landscape systems in which prefabricated frame members, panels and furniture components disposed in selected positions define work stations and corridors within large, otherwise open spaces. These systems support or contain various instruments, such as computers and accessory devices that include cables and other conduits that tend to tangle with one another and gather in an unsightly manner.

Thus, it is desirable for a landscape system to include means for securing the various cable and utility conduits and for routing them along predetermined paths over the system components. These means should allow quick and easy assembly with the other system components; and they should allow disassembly for easy replacement or removal of the conduits. Finally, these means should enhance the appearance of the system by removing unsightly bundles of cables and conduits.

The guide member of the present invention meets the requirements outlined above. It is a simple construction that effectively secures conduits and other elongate objects and routes those objects along predetermined paths on landscape systems. This construction minimizes the cost of fabrication and assembly and provides flexibility to a landscape system.

SUMMARY OF THE INVENTION

In accordance with one embodiment of the present invention, one or more guide members cooperate with edge portions of a support or partition member, releasably secure conduits or any other elongate objects, and route the objects along a predetermined path on the edge portions. Each guide member includes a body portion that defines an opening through which the conduits or other objects extend and a securing portion that secures the guide member to the support member.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a perspective view of a shelf portion of a landscape system including a vertical support with the guide members of the present invention;

FIG. 2 is a partial perspective view of the vertical support of FIG. 1, showing guide members of the present invention secured to the support;

While the following disclosure describes the invention in connection with one embodiment and modifications of that embodiment, one should understand that the invention is not limited to this embodiment and modifications. Furthermore, one should understand that the drawings are not to scale and that graphic symbols, diagrammatic representatives, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS

Turning now to the drawings and referring specifically to FIGS. 1 and 2, a landscape system L includes a shelf assembly A with vertical supports V and shelves S. The shelf assembly A supports various instruments (e.g., computers) that include power cables C or other utility conduits. A guide member assembly 10 of the present invention receives these cables and conduits C and routes them in an orderly manner to power outlets and other sources.

Figure 3:
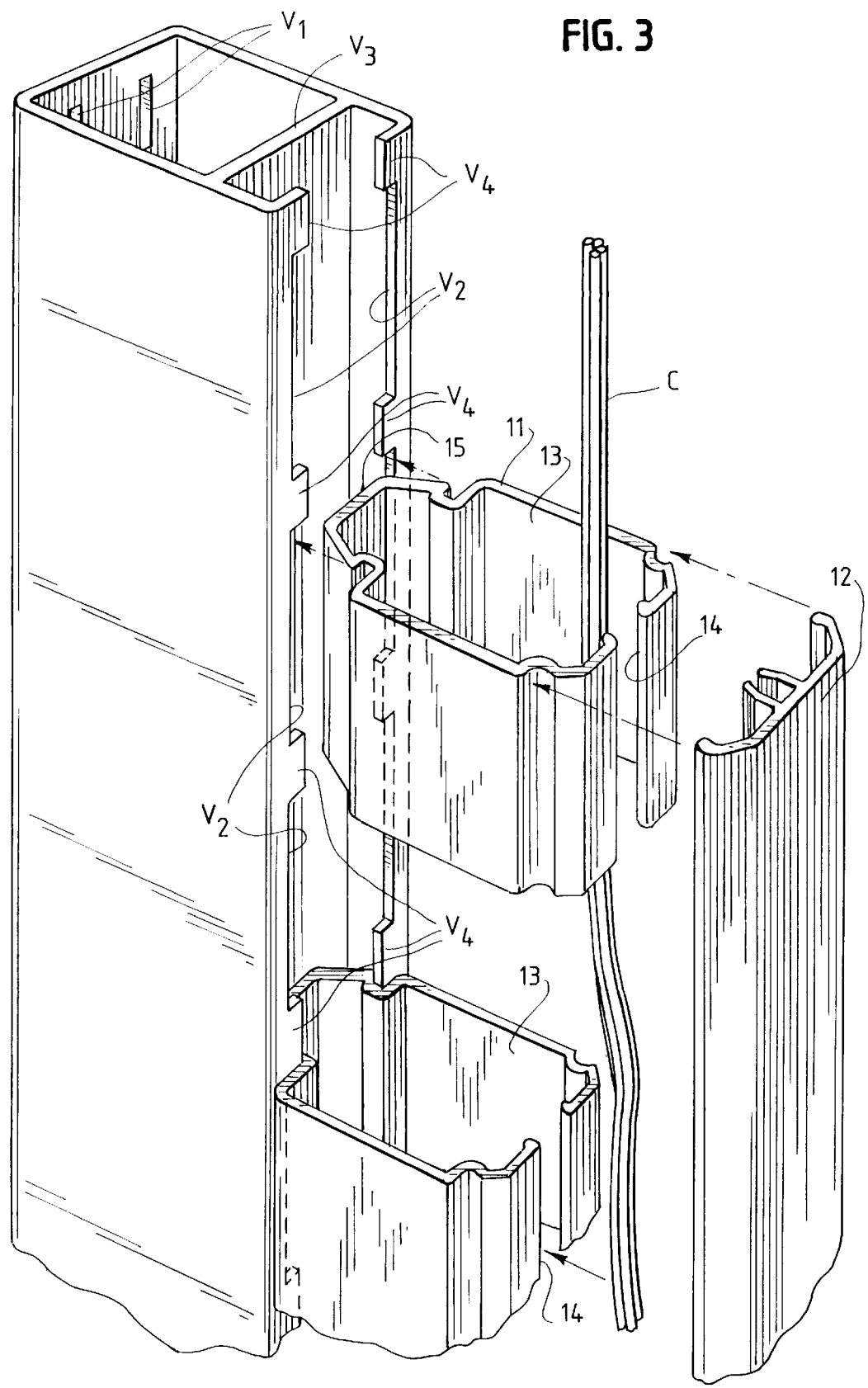
FIG. 3 is an enlarged and exploded perspective view of a vertical support and guide members of the present invention.

The guide member assembly 10 cooperates with a vertical support V as shown in FIGS. 2 and 3. The vertical support V is an elongate, generally rectangular member made of sheet metal or any other material of high strength and rigidity. It defines holes $V_1$ in one of its side walls for receiving hooks (not shown) of the shelves S and windows $V_2$ in an opposite side wall for receiving the guide member assembly 10. It includes an internal wall portion $V_3$ and tabs $V_4$ for supporting the guide member assembly 10 as described below.

Although the embodiment shown uses a generally rectangular vertical support V, the vertical support may have any one of a wide variety of shapes. In addition, horizontal supports of the landscape system L may also have the same or similar shape; and they may support and cooperate with a guide member assembly 10 to route cables and other utility conduits C in a horizontal direction. Furthermore, the system may further include cross-members disposed at an acute or obtuse angle to the horizontal and vertical members; and this cross-member may also include a guide member assembly for routing cables and utility conduits. Finally, the vertical support V may have the shape of a flat, panel-like wall member with a guide member assembly secured to one of its end portions or to an edge portion of one of its faces between its end portions.

Figure 4:
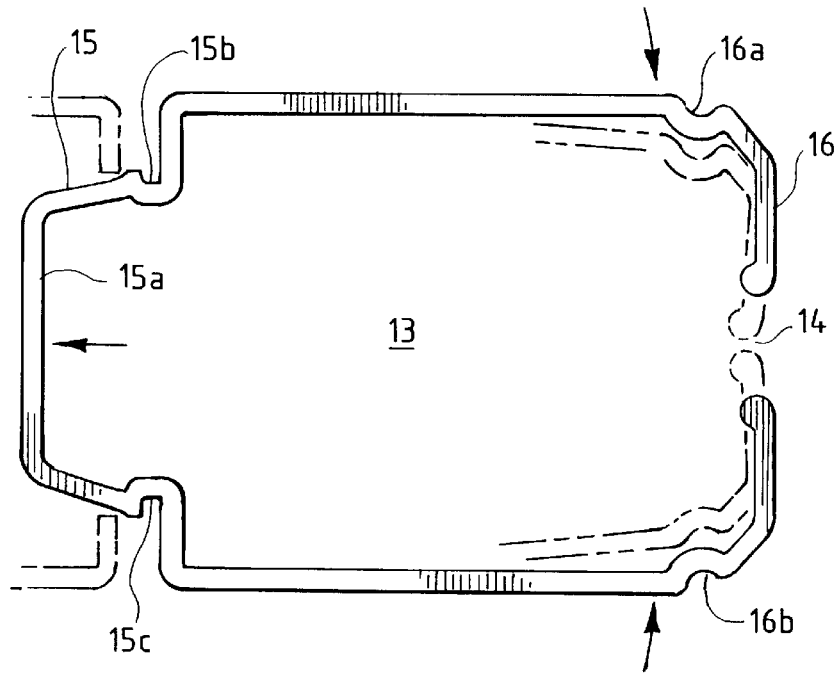
FIG. 4 is a top plan view of the guide member of the present invention.

The guide member assembly 10 includes guide members 11 releasably secured to the support V and a cap member 12 releasably secured to the guide members 11. (These components are made of plastic, sheet metal or any other suitable material.) Each guide member has a tube-like configuration with a central opening 13 and a slot 14 which extend across the member. The slot 14 extends along the center of one side wall of the guide member 11; and it allows the guide member 11 to flex, as shown in FIG. 4, so that an opposite side 15 of the guide member 11 may extend into the support V.

The side 15 of the guide member 11 includes a wall portion 15a and grooves 15b and 15c disposed at opposite ends of the wall portion 15. The wall portion 15a engages the internal wall portion $V_3$ of the support V and the grooves 15b and 15c receive edge portions of the support V adjacent the windows $V_2$ when the side 15 extends fully into the support and the guide member 11 flexes back into the rest position shown in solid lines in FIG. 4. The tabs $V_4$ of the support V act as stops to prevent upward and downward sliding of the guide member 11.

In the arrangement shown in FIGS. 1–3, every other window $V_2$ receives a guide member 11, leaving a gap between the members 11, a g ap larger than the length of a guide member 11. Alternatively, any number of the windows may receive a guide member 11. Moreover, although the drawings show guide members of equal length, the length of the guide member s may vary. Also, the guide member assembly may include only one elongate guide m ember that defines openings along its length for receiving the cables and utility conduits C.

Figure 5:
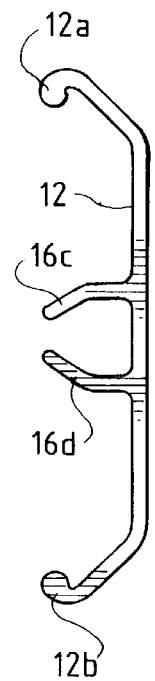
FIG. 5 is a top plan view of a cap segment of the present invention.
Figure 6:
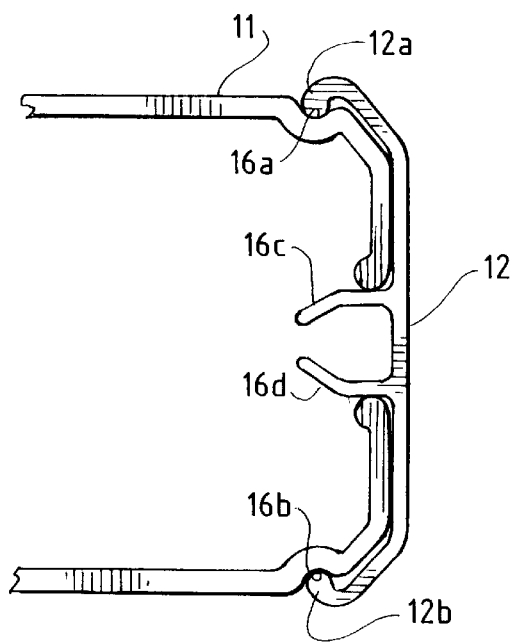
FIG. 6 is a partial, top plan view of the guide member of FIG. 4 with the cap segment of FIG. 5.

The cap member 12 covers a side 16 of each guide members 11, closing the slots 14 of each of those guide members 11. (The side 16 lies opposite the side 15 and it defines grooves 16a and 16b.) The cap member 12 has a contour that corresponds to the contour of the side 16 (See FIGS. 5 and 6); and it includes end portions 12a and 12b that snap into the grooves 16a and 16b, respectively. The cap member 12 also has two center tabs 16c and 16d that extend into the slot 14 and engage edge portions of each guide member 11 adjacent the slot 14 to releasably secure the cap member 12 to the guide member 11.

While the above description and the drawings disclose and illustrate one embodiment and various modifications, one should understand, of course, that the invention is not limited to this embodiment and modifications. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. In combination with an elongate support member defining a window opening and a cavity adjacent the window opening, a guide member having a length substantially smaller than the length of the support member and defining a longitudinally extending opening, the guide member including contacting end portions that co-operate with portions of the support member adjacent the window opening to releasably secure the guide member to the support member, the guide member defining a longitudinally extending slot disposed opposite the contacting end portions and adjacent the longitudinally extending opening.

2. The combination of claim 1, further comprising a cap segment for closing the slot.

3. The combination of claim 1, further comprising a plurality of guide members disposed in end-to-end, spaced apart relation.

4. The combination of claim 3, further comprising an elongate cap segment that closes the slots of the guide members.

5. The combination of claim 1 wherein the guide segment comprises a body having the shape of a thin-walled sleeve.

* * * * *